United States Patent
Sarab et al.

(10) Patent No.: US 10,255,287 B2
(45) Date of Patent: Apr. 9, 2019

(54) METHOD AND APPARATUS FOR ON-DISK DEDUPLICATION METADATA FOR A DEDUPLICATION FILE SYSTEM

(71) Applicant: Atlantis Computing, Inc., Mountain View, CA (US)

(72) Inventors: Farshid Eslami Sarab, San Jose, CA (US); Vikram Auradkar, Los Altos, CA (US)

(73) Assignee: HIVEIO INC., Hoboken, NJ (US)

( * ) Notice: Subject to any disclaimer, the term of this patent is extended or adjusted under 35 U.S.C. 154(b) by 781 days.

(21) Appl. No.: 14/815,482

(22) Filed: Jul. 31, 2015

(65) Prior Publication Data

US 2017/0031945 A1 Feb. 2, 2017

(51) Int. Cl.
*G06F 17/30* (2006.01)

(52) U.S. Cl.
CPC .............. *G06F 17/30156* (2013.01)

(58) Field of Classification Search
CPC ................................. G06F 17/30156
USPC ......................................... 707/692
See application file for complete search history.

(56) References Cited

U.S. PATENT DOCUMENTS

| 8,407,265 | B1 * | 3/2013 | Scheer | G06F 17/30138 707/823 |
| 8,566,821 | B2 * | 10/2013 | Robinson | G06F 9/485 714/15 |
| 8,935,506 | B1 * | 1/2015 | Gopalan | G06F 12/1009 711/202 |
| 8,983,952 | B1 * | 3/2015 | Zhang | G06F 11/1453 707/736 |
| 9,256,549 | B2 * | 2/2016 | Kimmel | G06F 3/0611 |
| 9,274,907 | B1 * | 3/2016 | Bachu | G06F 11/1448 |
| 9,304,889 | B1 * | 4/2016 | Chen | G06F 11/3452 |
| 9,460,102 | B1 * | 10/2016 | Bono | G06F 17/30156 |
| 9,772,789 | B1 * | 9/2017 | Natanzon | G06F 3/064 |
| 2003/0028772 | A1 * | 2/2003 | Allison | G06F 21/64 713/176 |
| 2005/0063406 | A1 * | 3/2005 | Pieczul | H04L 69/22 370/428 |
| 2010/0250501 | A1 * | 9/2010 | Mandagere | G06F 17/30489 707/692 |

(Continued)

*Primary Examiner* — Mark E Hershley
(74) *Attorney, Agent, or Firm* — Womble Bond Dickinson (US) LLP

(57) ABSTRACT

A method and apparatus is disclosed herein for maintaining deduplication metadata on disk separate from an in-memory deduplication file system for a deduplication computing system. The method may include reading deduplication metadata from a first memory of a deduplication computing system. Furthermore, the method may include maintaining deduplicated data for a file system in a second memory, and maintaining the deduplication metadata that describes the deduplicated data of the file system in the first memory of the deduplication computing system, wherein the first memory is a different type of memory and separated from the second memory in the deduplication computing system. Furthermore, the method may include accessing the deduplication metadata in the second memory in response to receipt of a request by the deduplication computing system to perform a first operation with deduplicated data of the file system in the second memory.

26 Claims, 8 Drawing Sheets

(56) References Cited

U.S. PATENT DOCUMENTS

| | | | |
|---|---|---|---|
| 2010/0332401 A1* | 12/2010 | Prahlad | G06F 17/30082 705/80 |
| 2011/0138144 A1* | 6/2011 | Tamura | G06F 3/0608 711/166 |
| 2011/0276744 A1* | 11/2011 | Sengupta | G06F 12/0866 711/103 |
| 2011/0276781 A1* | 11/2011 | Sengupta | G06F 12/0862 711/216 |
| 2011/0307447 A1* | 12/2011 | Sabaa | H04L 67/2842 707/637 |
| 2011/0307659 A1* | 12/2011 | Hans | G06F 3/0613 711/114 |
| 2012/0057703 A1* | 3/2012 | Hsuan | H04L 12/5692 380/268 |
| 2013/0036278 A1* | 2/2013 | Strzelczak | G06F 11/14 711/161 |
| 2013/0054524 A1* | 2/2013 | Anglin | G06F 17/30575 707/624 |
| 2013/0282662 A1* | 10/2013 | Kumarasamy | G06F 17/30289 707/649 |
| 2013/0282676 A1* | 10/2013 | Wade | G06F 17/30156 707/692 |
| 2013/0318051 A1* | 11/2013 | Kumar | G06F 17/30156 707/692 |
| 2013/0339298 A1* | 12/2013 | Muller | G06F 17/30283 707/640 |
| 2013/0346723 A1* | 12/2013 | Kawamura | G06F 3/0623 711/170 |
| 2014/0082145 A1* | 3/2014 | Lacapra | H04L 67/1097 709/219 |
| 2014/0244598 A1* | 8/2014 | Haustein | G06F 17/30156 707/692 |
| 2016/0019232 A1* | 1/2016 | Lambright | G06F 17/30159 707/692 |
| 2016/0291891 A1* | 10/2016 | Cheriton | G06F 21/6218 |
| 2016/0350391 A1* | 12/2016 | Vijayan | G06F 17/30575 |
| 2016/0357743 A1* | 12/2016 | Swaminathan | G06F 17/3033 |

\* cited by examiner

METHOD AND APPARATUS FOR ON-DISK DEDUPLICATION METADATA FOR A DEDUPLICATION FILE SYSTEM

TECHNICAL FIELD

Embodiments of the invention relate to the field of data storage, and more particularly, to maintaining a deduplication file system with deduplication metadata on disk and deduplicated file system data in memory.

BACKGROUND

Virtual machine hypervisors, or virtual machine monitors, are responsible for creating and running virtual machines on a host machine. The virtual machine hypervisor provides a simulated computing environment on the host machine, through which the virtual machine can interact with the host machine's resources, such as network access, peripheral device access, disk storage, computing resources, etc. Such resources often include a non-persistent memory (e.g., a random access memory) for temporarily storing data, and a persistent memory (e.g., a disk drive) for providing non-volatile data storage.

More than one virtual machine can be provisioned on a host machine. As a result, a high degree of repeated data is created among the virtual machines. Data deduplication can be used in such a virtualized computing environment to reduce storage requirements created by the provisioned virtual machines. How the data deduplication is employed, and how the persistent and non-persistent memory is utilized for providing the data deduplication, can have a significant impact on available system resources.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus is disclosed herein for maintaining deduplication metadata on disk separate from an in-memory deduplication file system for a deduplication computing system. In embodiments discussed herein, a deduplication computing system includes a volatile memory, such as a random access memory, flash memory, etc., and a non-volatile memory, such as a hard disk storage device. In one embodiment, a deduplication based file system including deduplicated data and other file system data is stored in the volatile memory of the deduplication computing system during runtime, while deduplication metadata is stored, updated, and retained in the non-volatile memory and referenced when needed.

In one embodiment, the deduplication metadata maintained in the non-volatile memory includes a deduplication metadata hash table that stores deduplication metadata for corresponding file system data, where the deduplication metadata is distributed within the hash table based on checksum/hash values computed from the corresponding data. The deduplication metadata also includes a masked checksum array arranged by file system logical block numbers that references blocks of data within the file system. In one embodiment, as discussed in greater detail below, the deduplication metadata hash table and the masked checksum array act as a double dictionary to enable the deduplication computing system to access deduplication metadata for corresponding file system data based either on a file system operation that references data or a logical block number for the data within the file system. Beneficially, the deduplication computing system with deduplication metadata maintained in non-volatile memory separated from user file system data maintained in volatile memory enables the deduplication computing system to provide fast access to file system data while significantly reducing the footprint of the deduplication file system in the volatile memory. By reducing the footprint of the deduplication file system, the mount time associated with such a deduplication file system is also reduced.

Figure 1:
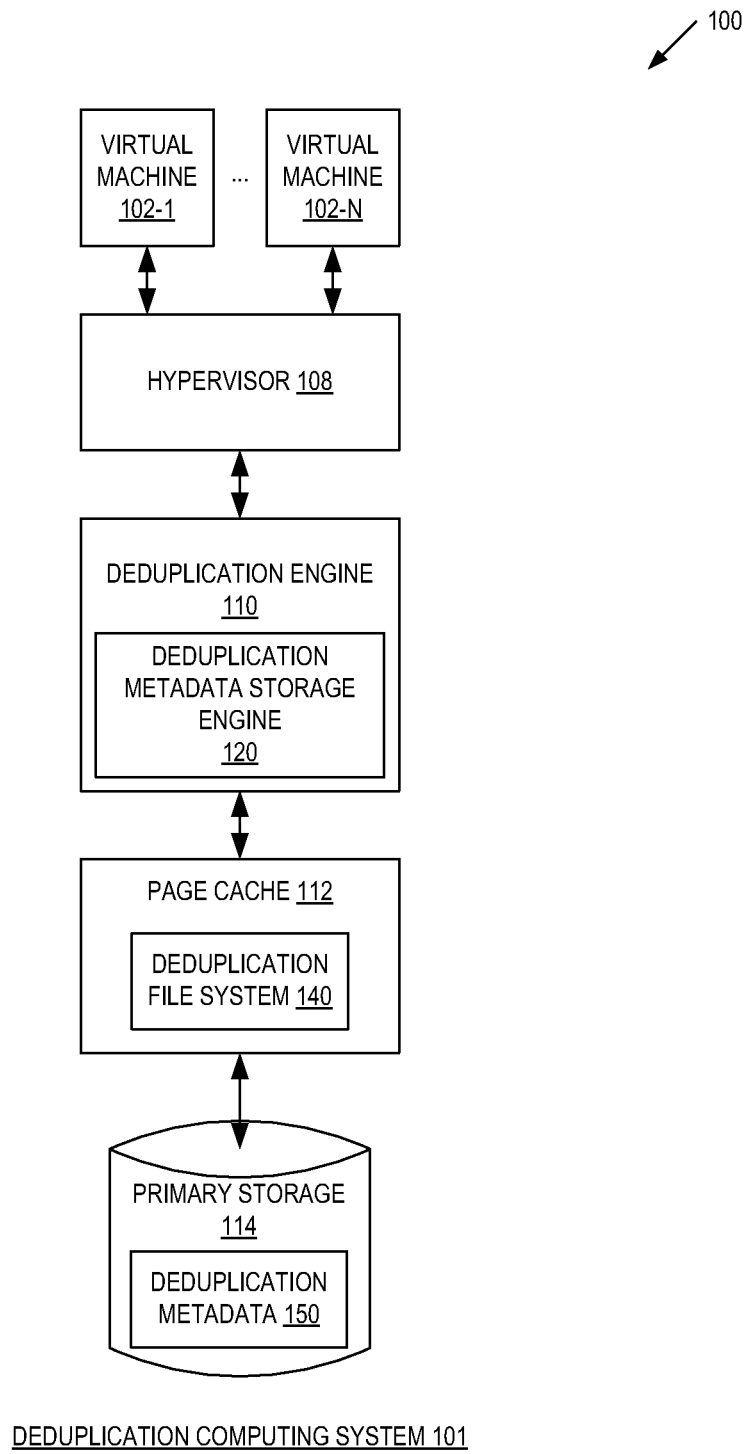
FIG. 1 is a block diagram of exemplary system architecture for a deduplication computing system with deduplication metadata separated from a deduplication file system.

FIG. 1 is a block diagram of exemplary system architecture 100 for maintaining deduplication metadata separate from a deduplication file system in a deduplication computing system 101. In one embodiment, deduplication computing system 101 provides a virtualized computing environment that includes one or more virtual machines (i.e., VM 102-1 through 102-N), hypervisor 108, deduplication engine 110, page cache 112, and primary storage 114. The number, type, configuration, topology, connections, or other aspects of deduplication computing system 101, may be varied and are not limited to the examples shown and described. For example, VM 102-1 through 102-N could be physical computing nodes in a physical computing system, as well as a combination of virtual and physical nodes.

In deduplication computing system 101, a virtual machine (i.e., VM 102-1 through 102-N) may be an instance of an operating system running on various types of hardware, software, circuitry, or a combination thereof (e.g., x86 servers) that are managed by hypervisor 108. As shown, deduplication engine 110 may be used to deduplicate data using page cache 112 as a memory into which data may be read or written before being asynchronously (or, in some embodiments, synchronously) written back to primary storage 114. In one embodiment, deduplication engine 110 can be run on a physical computing node in the deduplication computing system 101. In another embodiment, deduplication engine 110 can be run by a virtual computing node in the deduplication computing system 101, such as one of virtual machines 102-1 through 102-N.

In one embodiment, deduplication engine 110 removes duplicate information in VM files in a read or write path of the virtualized computing environments (i.e., Virtual Desktop Infrastructure (VDI)/Hosted Virtual Desktop ("HVD")) of the deduplication computing system 101. Duplicate information is any block information that is already stored from a prior copy of the same data or from a different data set.

In some embodiments, a virtualized computing environment may be composed of a plurality of VMs, such as virtual machine 101-1 and 102-N, running desktop operating systems (e.g., Windows XP or Windows 7 Enterprise by MICROSOFT CORPORATION® of Redmond, Wash.) on a virtualized hardware layer (such as those provided by companies such as VMWARE®, CITRIX®, MICROSOFT®, REDHAT®, or other makes of operating systems). A virtualized software layer (e.g., hypervisor 108) provides memory, disk (e.g., storage), and processing (i.e., CPU) resources to the VMs. The plurality of VMs, in one embodiment, access storage through deduplication engine 110.

In one embodiment, deduplication engine 110 is configured to identify and remove duplicate information from deduplication file system 140, replacing the duplicate information with pointers to a single copy of data, while a write operation from one or more of the VMs is still "in-flight" (i.e., sent to, but not written to permanent storage or disk (hereafter referred to as "primary storage")). In one embodiment, the deduplication uses page cache 112 of a deduplication engine 110 for storage of virtual machine or user data within the deduplication file system 140. That is, page cache 112 is a non-persistent memory for use by deduplication engine 110, such as a flash memory, general purpose random access memory ("RAM"), or other volatile memory that requires power to maintain the data stored therein. In one embodiment, as discussed below, data from page cache 112 is periodically flushed, or committed, to primary storage 114. In one embodiment, deduplication engine 110 may be configured to perform operations (e.g., read, write, copy on write, overwrite, redirect, and other operations) on blocks of fixed lengths, such as 4 kilobyte blocks. In another embodiment, blocks of variable lengths may be processed by deduplication engine 110 in accordance with the description herein. In one embodiment, the deduplication engine 110 processes data "inline," i.e., in the data path or connection between a VM and primary storage, in real time or substantially real-time. In one embodiment, deduplication engine 110 may be configured to provide an inline and real-time or substantially real-time deduplication of data as the data is in-flight from one or more of VMs 102-1 and 102-N to primary storage 114.

Primary storage 114 may be implemented using a computer hard disk based on rotational spindle, a computer hard disk based on Solid State Technologies, a redundant array of independent disks (hereafter "RAID") storage system that aggregates multiple computer hard disks, a storage area network (hereafter "SAN"), network attached storage (hereafter "NAS") that aggregates multiple RAID storage systems, among others. That is, primary storage 114 is a persistent, non-volatile memory that does not require power to maintain the data stored therein. In one embodiment, as will be discussed in greater detail below, deduplication metadata 150 for the deduplication file system 140 is separated from the deduplication file system 140, and maintained in primary storage 150.

In one embodiment, deduplication engine 110 is configured to eliminate duplicate copies of data to effect a form of data compression to maximize storage capacity of file system 140 data, and minimize time to storage. In a deduplication-based file system, such as those implemented by deduplication computing system 101, deduplication engine 110 identifies duplicate copies of data, and implements reference links to point to the original data rather than storing another, redundant copy. As a result, duplicate data is not stored according to embodiments discussed herein. For example, deduplication engine 110 can store a reference link to the original data, instead of storing the duplicate data, in the form of deduplication metadata 150, which functions to describe the relationship between the original data and the deduplicated data. Examples of techniques used in deduplication of virtual machine files are described in U.S. Pat. No. 8,996,800, entitled "Deduplication of Virtual Machine Files in a Virtualized Desktop Environment," which is incorporated herein in its entirety.

Figure 2A:
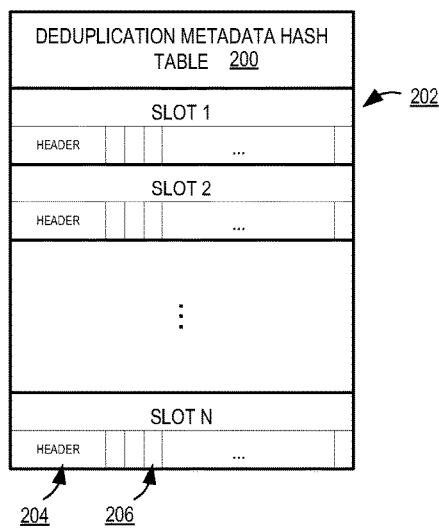
FIG. 2A is an illustration of one embodiment of a deduplication metadata hash table.

In embodiments discussed herein, deduplication metadata storage engine 120 of deduplication engine 110 stores deduplication metadata 150 in at least a deduplication metadata hash table and a logical block number array. For example, a deduplication metadata hash table 200 is illustrated in FIG. 2A and a logical block number array 230 is illustrated in FIG. 2B. In one embodiment, the deduplication metadata hash table 200 is a data structure maintained by deduplication metadata storage engine 120 on disk in primary storage 114. The metadata within deduplication metadata hash table 200 describes or maps the relationships between the deduplicated data and the original data, such as maintaining a number of references to a block of data, maintaining a unique identifier for the block of data, maintaining a logical block number associated with a physical storage location of the data block, maintaining a reference link that associates the block of deduplication metadata to a physical location where the corresponding data block for the file can be located, as well as other deduplication metadata. In one embodiment, the unique identifier is a checksum or hash value generated by a hashing function, such as a SHA-1, MD5, etc. function, applied to data.

Deduplication metadata hash table 200, in one embodiment, is arranged with a plurality of slots 202, such as slot 1, slot 2, through slot N, where each slot is responsible for storing a plurality of deduplication metadata entries for corresponding deduplicated data. In one embodiment, each slot is configured with a header 204, and zero or more entries 206. The header 204 starts a slot and includes data about the slot, such as number of entries within the slot. The entries within a slot store deduplication metadata, such as unique identifier for original data, reference count, logical block number, etc. In one embodiment, each slot is capable of storing 127 entries (e.g., deduplication metadata for 127 different pieces of data within file system 140). Thus, each slot can store deduplication metadata for a range of unique identifier values. In one embodiment, the range of values that each slot will accept is determined based on the unique identifiers for those values. For example, slot 1 may be configured to store deduplication metadata associated with checksums in the range of 1-10, slot 2 configured to store deduplication metadata associated with checksums in the range of 11-20, through a maximum checksum value.

As will be discussed in greater detail below, the number of slots within deduplication metadata hash table 200 is dynamic, and can grow or shrink based on usage of the slots 202. Thus, in one embodiment, slots may either link to additional slots when a particular slot is full, or the total number of slots can be increased or decreased when one or more slots are approaching a maximum number of slots, or a maximum number of entries across all slots is reached. In one embodiment, one or more of these maximum values can be preset as a cushion value, which causes the growth of the hash table, or as discussed below the linking of a slot to another slot, when the cushion is exceeded.

In one embodiment, the masked checksum (MCS) array 230 is another deduplication metadata data structure maintained by deduplication metadata storage engine 120 on disk in primary storage 114. The entries 232 of the MCS array 230 are arranged sequentially by logical block number, and correspond to the sequential blocks in deduplication file system 140. Furthermore, each entry stores at least a part of the unique identifier/checksum for the data physically stored at the corresponding file system 140 block. In one embodiment, the part of the unique identifier/checksum can be referred to as a masked checksum and is a lower portion of the bits corresponding to a unique identifier. Then, based on a number of slots that have been allocated, a particular portion of a checksum (e.g., the checksum mask) from MCS array 230 can be used as an index to the appropriate slot where the checksum can be found corresponding to data referenced by a logical block number.

In one embodiment, the two data structures (e.g., deduplication metadata hash table 200 and MCS array 230) enable deduplication engine 110 to access deduplication metadata 150 in primary storage 114 whenever data needs to be changed, added, deleted, etc. within deduplication file system 140. For example, a write operation may be received by deduplication engine 110 for writing a block of data to deduplication file system 140. From the data block to be written, deduplication engine 110 can compute a unique identifier/checksum for that data block, determine the slot of deduplication metadata hash table 200 in which the data block would have a deduplication entry (if one exists), look for that entry, and either add a new deduplication metadata entry or update the reference count and pointers when duplicate data exists within deduplication file system 140. As another example, a delete operation may be received by deduplication engine 110 and refer to a logical block number to be deleted from deduplication file system 140. From the logical block number, the MCS array 230 can be accessed based on the logical block number to determine the masked checksum associated with the logical block number, use that value as an index to a slot of the deduplication metadata hash table 200, and then to locate the corresponding deduplication metadata entry within the slot (if one exists). Thus, the deduplication metadata hash table 200 and MCS array 230 provide the double dictionary needed to enable deduplication engine 110 access to deduplication metadata in primary storage 114 whether a data block or a logical block number is used.

In one embodiment, because deduplication metadata hash table 200 is maintained in primary storage 114, and data operations occur frequently with deduplication computing system 101, there is the possibility that two or more competing operations could be received simultaneously or nearly simultaneously by deduplication engine 110. That is, data operations that could access and/or modify the same deduplication metadata and cause the metadata to potentially go out of sync with the data in deduplication file system 140.

Some systems solve this problem by processing the data operations serially and locking all access to deduplication metadata for later operations until a current operation is finished. For example, a first operation that would update deduplication metadata is processed, and a second operation is delayed by application of a lock to that operation. When the first operation is done, the lock is released and the second operation is allowed to proceed. This is very inefficient because all data operations are serialized and one lock is applied to the entire deduplication data structure, regardless of which deduplication metadata is being accessed and/or modified by the different operations.

Figure 2C:
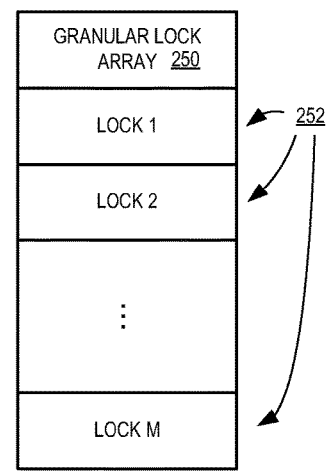
FIG. 2C is an illustration of one embodiment of a granular lock array for enabling parallel access to deduplication metadata.
Figure 2B:
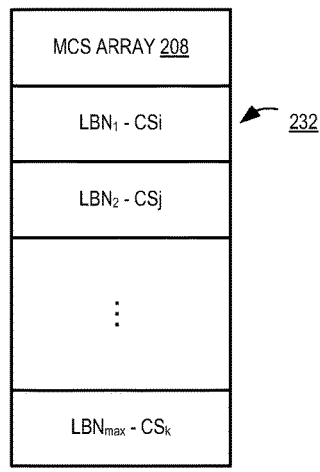
FIG. 2B is an illustration of one embodiment of a masked checksum array arranged by logical block number.

In one embodiment, deduplication metadata storage engine 120 maintains a granular lock array 250, as illustrated in FIG. 2C. In one embodiment, the granular lock array 250 is maintained in the memory of system 101 along with deduplication metadata storage engine 120. However, granular lock array 250 may also be maintained in page cache 110 along with deduplication file system 140. In one embodiment, granular lock array 250 includes a plurality of locks 252 (e.g., lock 1 through lock M) arranged as an array, or any other data structure. In one embodiment, each lock or set of locks can be associated with one or more slots. That is, for a data operation that impacts slot 1 of deduplication metadata hash table 200, one or more locks from the array 250 can be applied to other data operations that would have an impact on slot 1. However, because no locks are being applied to slot 2 through slot N, then a data operation received by deduplication engine 110 impacting any of slots 2 through N can be processed in parallel with the operation impacting slot 1. For this parallel operation, deduplication metadata engine 120 would select the appropriate lock(s) from the granular lock array 250 to apply. The application of the locks 252 of the granular locking array 250 by deduplication metadata storage engine 120 enables independent and parallel access to different portions of the deduplication metadata hash table 200, thereby increasing the parallelization, efficiency, and throughput of the deduplication engine 110.

In one embodiment, both deduplication application 110 and deduplication metadata storage engine 120 can use page cache 112, as discussed above, when they are located on the same computer system or computing node within system 101. However, in another embodiment, deduplication application 110 and deduplication metadata storage engine 120 may be located on different computer systems or computing nodes. In this embodiment, deduplication application 110 and deduplication metadata storage engine 120 may use the page cache of the computers upon which they are respectively located.

Figure 3:
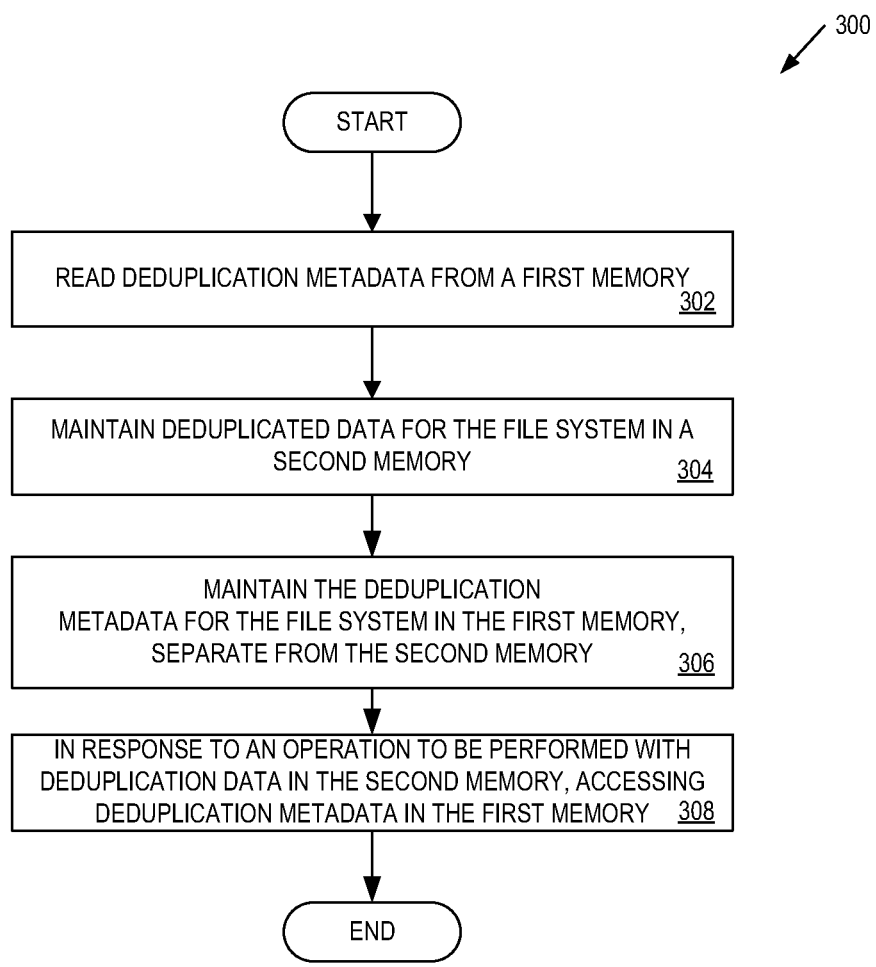
FIG. 3 is a flow diagram of one embodiment of a method for maintaining deduplication metadata on disk and separate from a deduplication file system maintained in memory of a deduplication computing system.

FIG. 3 is a flow diagram of one embodiment of a method 300 for maintaining deduplication metadata on disk and separate from a deduplication file system maintained in memory of a deduplication computing system. The method 300 is performed by processing logic that may comprise hardware (circuitry, dedicated logic, etc.), software (run on a general purpose computer system or a dedicated machine), firmware, or a combination. In one embodiment, the method 300 is performed by a deduplication metadata storage engine, such deduplication metadata storage engine 120 described above with respect to FIG. 1.

Referring to FIG. 3, the process begins by reading deduplication metadata from a first memory (processing block 302). In one embodiment, the deduplication metadata describes data of a file system of a deduplication computing system. In one embodiment, the deduplication metadata includes a deduplication metadata superblock. The deduplication metadata superblock can contain information about the file system and properties of the associated deduplication metadata, such as size, layout of sections, status of sections, references to other metadata structures (e.g., deduplication metadata hash table and MCS array), as well as other data that describes the properties of the deduplication metadata. In one embodiment, this deduplication metadata superblock of deduplication metadata is stored at the beginning of a storage of the deduplication metadata (e.g., at a beginning of the deduplication metadata stored within the first memory). As discussed herein, the deduplication metadata superblock is different from a file system superblock, which is typically maintained at the beginning of a storage of the file system.

Processing logic then maintains deduplicated data for the file system in a second memory of the deduplication computing system (processing block 304) and maintains deduplication metadata for the file system in the first memory of the deduplication computing system, separate from the second memory (processing block 306). In one embodiment, deduplicated data, such as user data, VM OS data, etc., is maintained in-memory of the deduplication computing system, such as within a volatile system memory. By maintaining the underlying user, VM, system data in volatile memory, a deduplication engine has fast and efficient access to the data of the file system. Furthermore, deduplication metadata, such as a deduplication metadata hash table 200 and MCS array 230, is maintained within non-volatile memory of a deduplication computing system, separately from the deduplicated file system data in the volatile memory. The separation of the file system data and the deduplication metadata into different types of memory, separated from one another, removes the metadata from the volatile storage requirements, thereby reducing the footprint of the file system within the potentially constrained volatile storage space of a deduplication computing system.

However, in one embodiment, the deduplication metadata storage can be stored as a file in the non-volatile memory and be included in the deduplication file system itself, or another file system. That is, the deduplication metadata can be maintained by processing logic, as one or more files, within the file system itself separate from the deduplicated data for the file system.

In response to a data operation to be performed with deduplicated data in the second memory (e.g., a read, delete, modify, write, etc.), processing logic accesses the deduplication metadata in the first memory (processing block 308). In one embodiment, processing of the data operation is performed on file system data, such as deleting a block of data from the file system, adding a new block of data to the file system, modifying a block of data within the file system, etc. To enable access to the correct data block in the file system, processing logic accesses the appropriate metadata and updates the metadata as needed using data deduplication techniques.

Figure 4A:
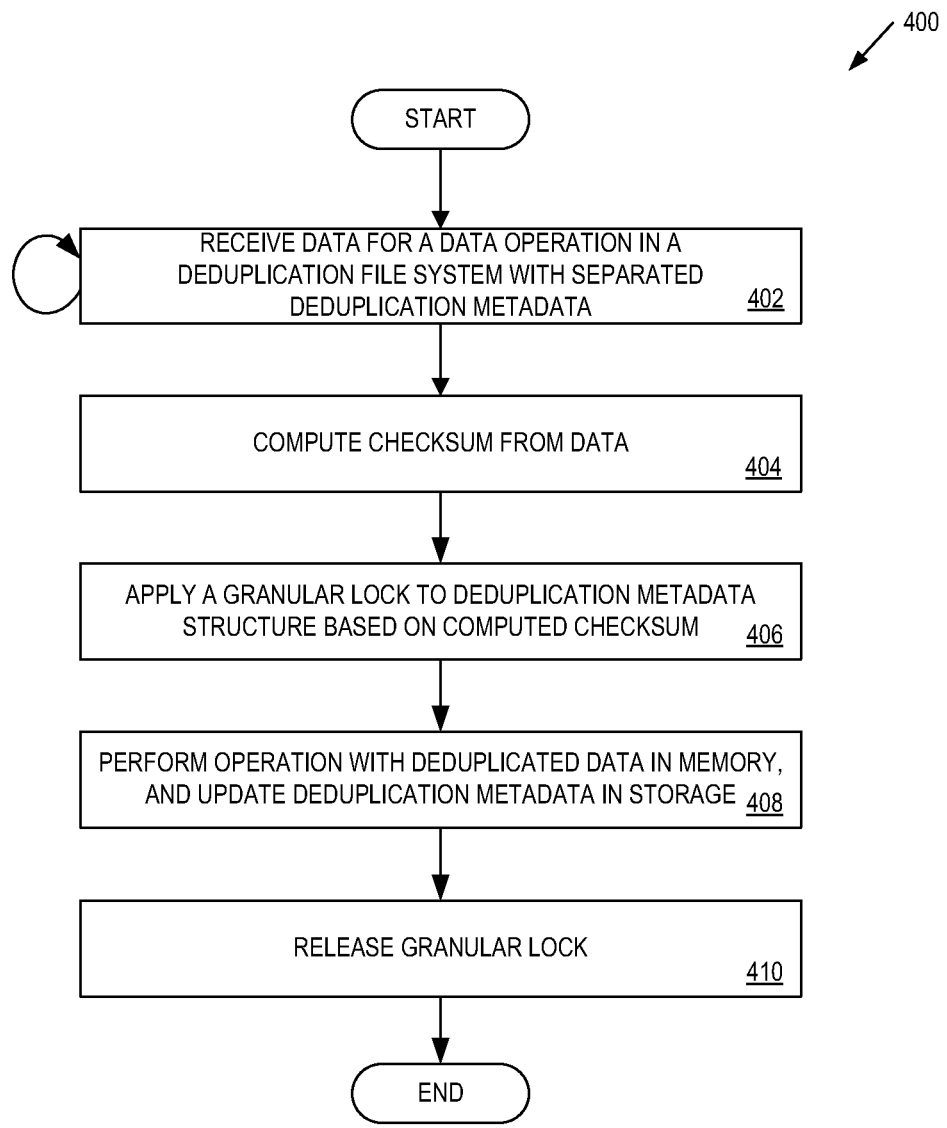
FIG. 4A is a flow diagram of one embodiment of a method for applying a granular lock when accessing deduplication metadata based on a checksum value.

FIG. 4A is a flow diagram of one embodiment of a method 400 for applying a granular lock when accessing deduplication metadata based on a checksum value. The method 400 is performed by processing logic that may comprise hardware (circuitry, dedicated logic, etc.), software (run on a general purpose computer system or a dedicated machine), firmware, or a combination. In one embodiment, the method 400 is performed by a deduplication metadata storage engine, such deduplication metadata storage engine 120 described above with respect to FIG. 1.

Referring to FIG. 4A, the process begins by receiving data for a data operation in a deduplication file system with separated deduplication metadata (processing block 402). In one embodiment, the data operation can be a write operation, and the data is to be written to a block within the file system. Furthermore, as discussed above, the file system data is maintained in the volatile memory of a deduplication computing system.

Processing logic computes a checksum from the data (processing block 404). In one embodiment, the checksum is a hash value computed with a hashing function that transforms the data into a value of a fixed size (e.g. 128 bits). In one embodiment, the MD5 hashing function is used to compute the checksum=.

Based on the computed checksum value, processing logic applies a granular lock to a deduplication metadata data structure (processing block 406). In one embodiment, the deduplication metadata structure is a hash table that contains a dynamic number of slots, with deduplication data entries distributed among the slots based on associated checksum values. In the deduplication metadata hash table 550 illustrated in FIG. 5B, an example with simplified four digit binary checksum values shows distribution of checksums, and thus deduplication metadata, into two slots. In this example, the distribution is based on the lowest digit of the checksum value so that checksum values ending in 0 are distributed to, and accessible in, slot 1, and checksum values ending in 1 are distributed to, and accessible in, slot 2. Thus, continuing the example, if the data operation were to write data having a checksum value of 1110, a granular lock could be applied to slot 1, leaving slot 2 free for any incoming data operations that could be processed in parallel.

Processing logic performs the operation with deduplicated data in memory, and updates the deduplication metadata in storage (processing block 408). The granular lock can then be released once the operation and metadata updates are complete (processing block 410).

Figure 4B:
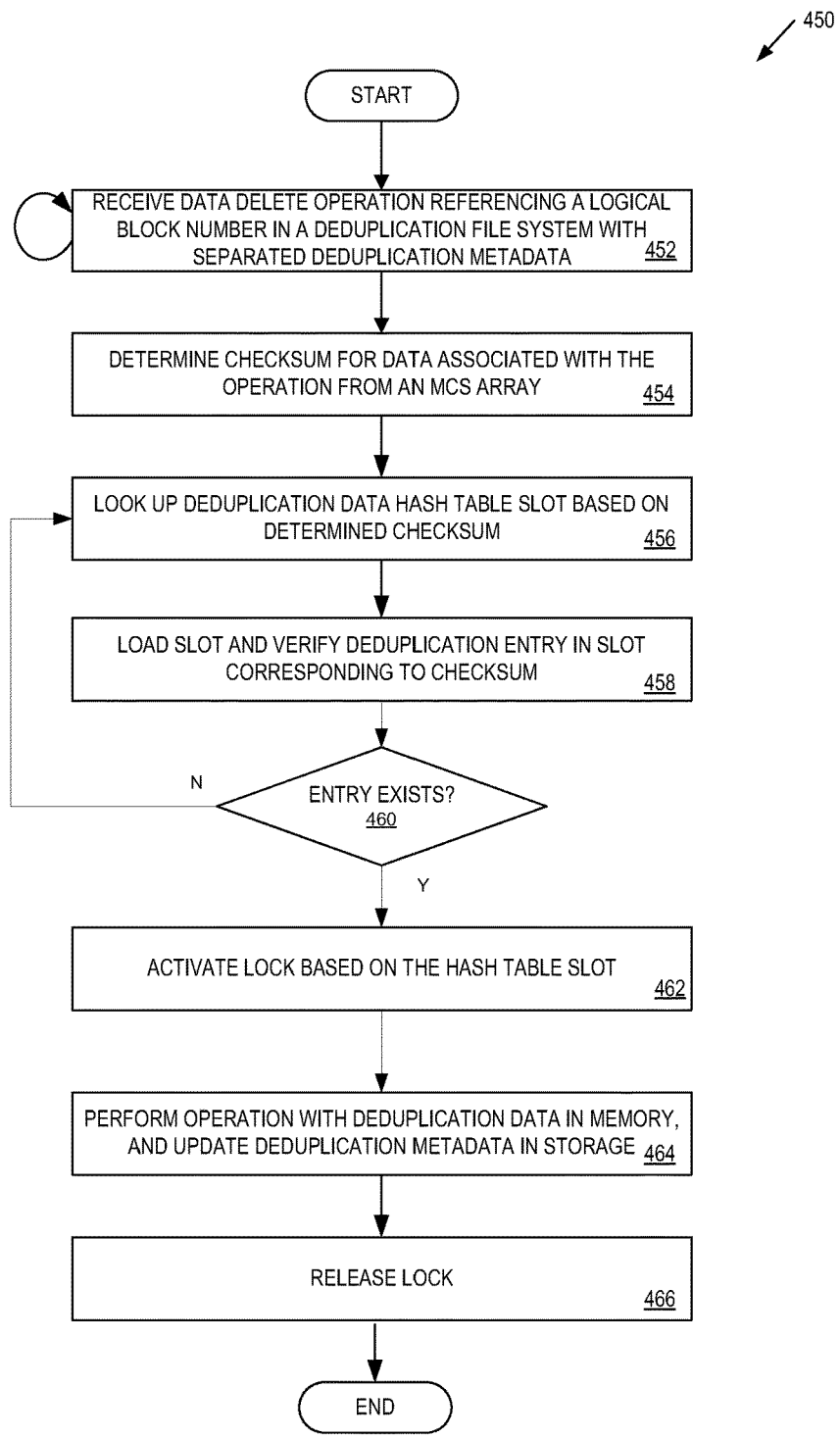
FIG. 4B is a flow diagram of one embodiment of a method for applying a granular lock when accessing deduplication metadata based on a logical block number.

FIG. 4B is a flow diagram of one embodiment of a method 450 for applying a granular lock when accessing deduplication metadata based on a logical block number. The method 450 is performed by processing logic that may comprise hardware (circuitry, dedicated logic, etc.), software (run on a general purpose computer system or a dedicated machine), firmware, or a combination. In one embodiment, the method 450 is performed by a deduplication metadata storage engine, such deduplication metadata storage engine 120 described above with respect to FIG. 1.

Referring to FIG. 4B, the process begins by receiving a data delete operation referencing a logic block number in a deduplication file system with separated deduplication metadata (processing block 452). Whereas FIG. 4A utilized the data, and thus the computed checksum value, to locate deduplication metadata, FIG. 4B utilizes logical block numbers corresponding to physical locations of data within a file system to locate and access deduplication metadata.

Processing logic determines a checksum for data associated with the operation from an MCS array (processing block 454). As discussed herein, the MCS array is maintained on disk in a non-volatile memory of a deduplication computing system. The MCS array is arranged sequentially by logic block number to correspond with the sequential blocks of physical in-memory storage of the deduplication file system data. In one embodiment, the MCS array contains a portion of the checksums of the associated data, referred to as a masked checksum value. In one embodiment, the portion of the checksum is the lower 64 bits of a 128-bit checksum value associated with a block of data.

Processing logic then looks up a deduplication metadata hash table slot based on the determined checksum (processing block 456). As discussed herein, the metadata entries for file system data are distributed among the deduplication metadata hash table slots based on checksum values. Thus, the lookup performed at processing block 456 utilizes the determined checksum value/mask as an index into a particular slot where the checksum, and thus deduplication metadata entry, may be located. Processing logic loads the slot and verifies that the deduplication entry corresponding to the checksum is in the slot (processing block 458). When the entry does not exist within the slot (processing block 460), the process returns to processing block 456 to check a next slot. This situation generally occurs when a portion of the checksum value is used as an index into a slot, which is linked to another slot (as discussed herein). As another example, when the hash table is expanding or shrinking, an entry in a slot can be moved, in which case processing logic would return to processing block 456 to search additional slots.

However, when the entry does exist within a slot, processing logic activates a granular lock associated with the loaded slot (processing block 462), performs the operation including updating deduplication metadata (processing block 464), and releasing the corresponding granular lock (processing block 466), similar to the discussion of processing blocks 406-410 above in FIG. 4A.

Figure 5A:
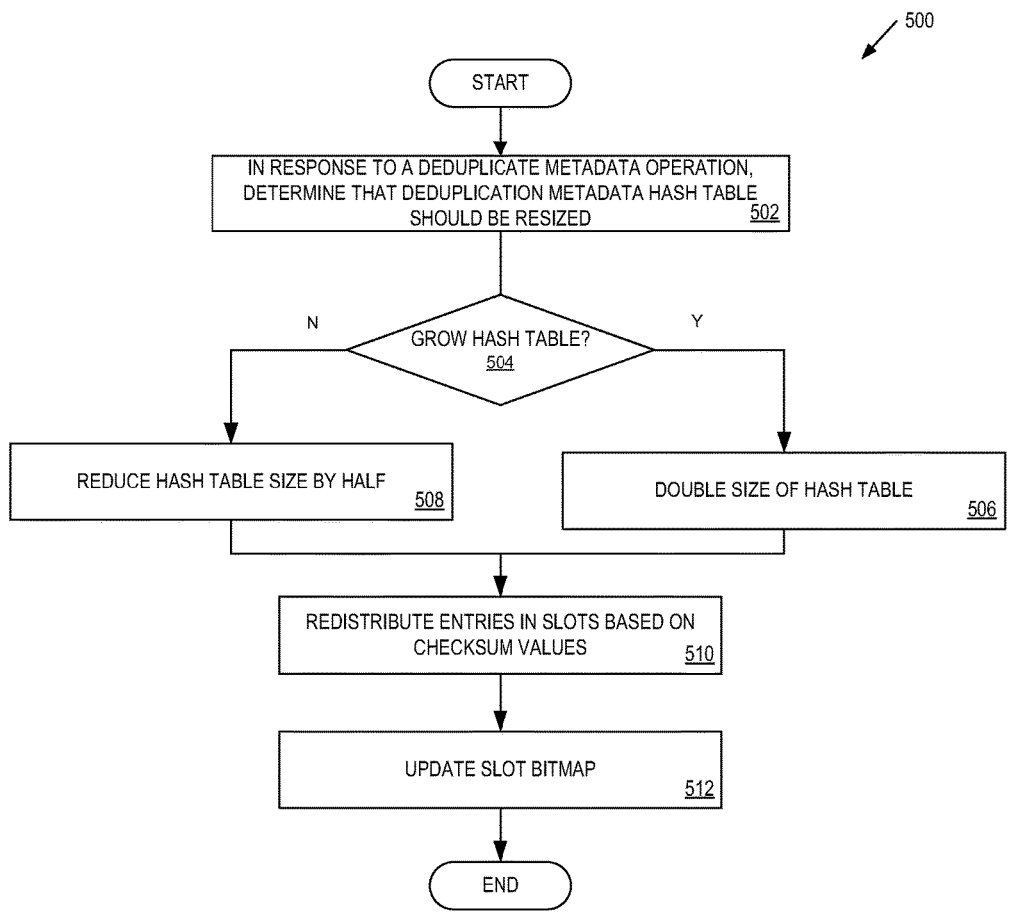
FIG. 5A is a flow diagram of one embodiment of a method for dynamically growing and shrinking a deduplication metadata hash table.

FIG. 5A is a flow diagram of one embodiment of a method 500 for dynamically growing and shrinking a deduplication metadata hash table. In one embodiment, the deduplication metadata hash tables, as discussed above, may be pre-allocated to a maximum size, thereby containing the maximum number of slots. However, in another embodiment, the deduplication metadata hash table is resized dynamically based on one or more runtime conditions such as overall deduplication metadata hash table usage, distribution of deduplication entries within slots of the deduplication metadata hash table, number of blocks used in a file system, as well as other conditions. By dynamically resizing the deduplication metadata hash table, access times associated with deduplication metadata access may be improved, and memory usage in non-volatile memory may be improved.

The method 500 of FIG. 5A is performed by processing logic that may comprise hardware (circuitry, dedicated logic, etc.), software (run on a general purpose computer system or a dedicated machine), firmware, or a combination. In one embodiment, the method 500 is performed by a deduplication metadata storage engine, such deduplication metadata storage engine 120 described above with respect to FIG. 1.

Referring to FIG. 5A, the processing begins by determining that deduplication metadata hash table should be resized (processing block 502). In one embodiment, when a maximum number of entries within a slot is reached, a maximum total number of entries, or a total number of data blocks in a file system exceeds a limit, the deduplication metadata hash table can be increased in size. Similarly, when a number of entries or data blocks falls below a threshold, the deduplication metadata hash table can be decreased in size.

When processing logic determines that the deduplication metadata hash table should be grown (processing block 504), processing logic doubles the size of the hash table (processing block 506). Conversely, when processing logic determines that the deduplication metadata hash table should not be grown (processing block 504), processing logic reduces the size of the deduplication metadata hash table by half (processing block 508).

Figure 5B:
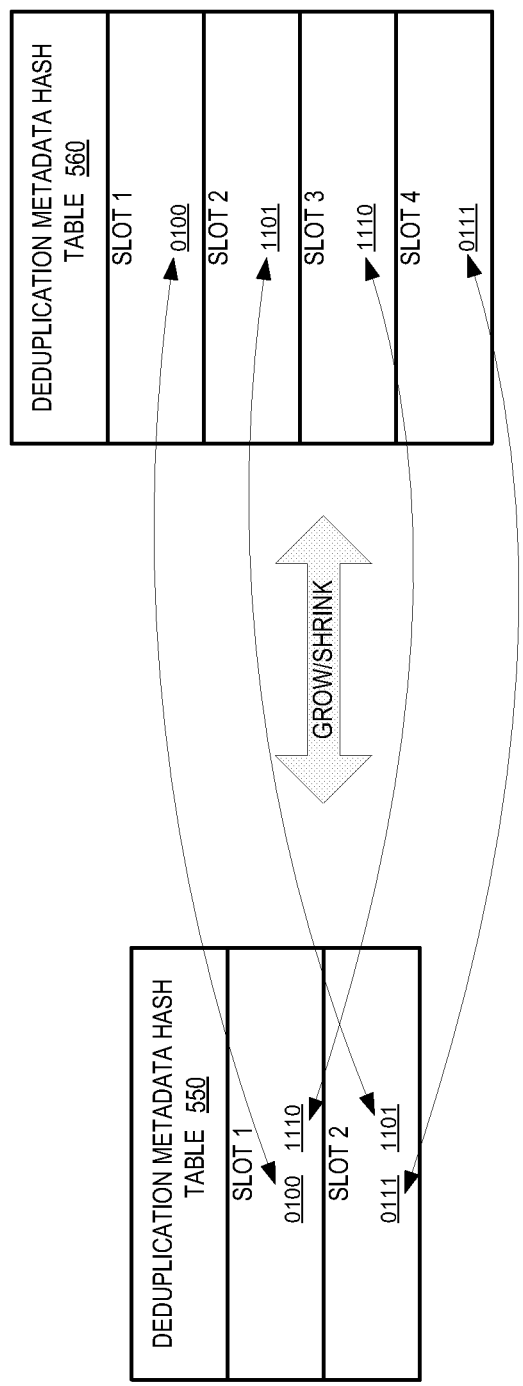
FIG. 5B is a block diagram illustrating an example of redistribution of deduplication metadata based on checksum values when a deduplication metadata hash table is grown or shrunk.

In either scenario, growing or shrinking, processing logic redistributes entries to the slots of the deduplication metadata hash table based on the checksum values (processing block 510). The distribution, in one embodiment, can be based on a portion of the checksum values of the associated metadata entries. In one embodiment, the size of the portion of the checksum value used for distribution is a function of the number of slots available for distribution of metadata entries. FIG. 5B illustrates an example of a deduplication metadata hash table 550 that includes two slots, with two entries per slot. In the illustrated example, a binary value is used to represent the checksum associated with a deduplication data entry. Furthermore, the deduplication metadata entries are sorted into the slots based on the lowest digit of their corresponding checksum values (i.e., slot 1 stores entries with checksums having a lowest digit of 0, and slot 2 stores entries with checksums having a lowest digit of 1). When the size of the deduplication metadata hash table 560 is doubled, the entries are distributed among the slots. In one embodiment, a larger portion of the checksum values may then be used to distribute the metadata entries and distinguish among the greater number of slots in deduplication metadata hash table 560. In this example, the last two digits of the exemplary binary checksum values are used to distribute the four entries among the four slots of deduplication metadata hash table 560.

When it is determined that a size of the deduplication metadata hash table 560 should be reduced, again the metadata entries are distributed among the available slots based on a function of a portion of the checksum values. In one embodiment, a modulo operation is applied to the portion of the checksum to determine where, among the reduced number of slots, the entries should be distributed.

In both scenarios, growing and shrinking, the checksum values computed from the associated data are assumed to have a uniform distribution. Thus, the distribution of deduplication metadata entries to slots and entries within the slots can also be assumed to be uniform. When, however, a particular slot becomes overly loaded (e.g., one that exceeds a predetermined amount), and the deduplication metadata hash table as a whole is not overloaded, a single slot can be expanded by linking it to a newly allocated/reserve slot. The deduplication metadata entries within these linked slots would be subject to the entry redistribution as discussed above.

Referring back to FIG. 5A, after the entries are redistributed, processing logic updates a slot bitmap (processing block 512). In one embodiment, the slot bitmap is another deduplication metadata data structure, maintained on disk in a primary storage of a deduplication computing system. The slot bitmap enables a data deduplication engine, such as deduplication metadata storage engine 120, to determine which slots are used, free, available for expansion, etc.

Figure 6:
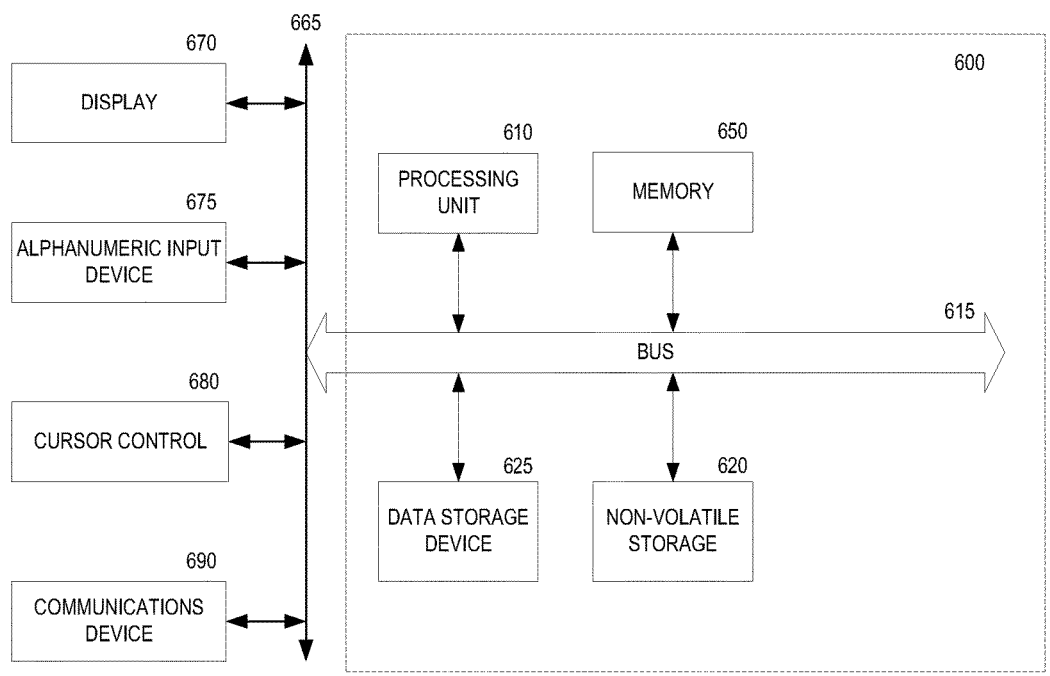
FIG. 6 illustrates an example schematic drawing of a computer network infrastructure.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light-emitting diode display (LED display) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, touchpad, or cursor direction keys coupled to bus 615 through bus 665 for communicating direction information and command selections to processor 610, and for controlling cursor movement on display device 670.

Another device, which may optionally be coupled to computer system 600, is a communications device 690 for accessing other nodes of a distributed system via a network. The communications device 690 may include any of a number of commercially available networking peripheral devices such as those used for coupling to an Ethernet, token ring, Internet, or wide area network. The communications device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

In the preceding description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "mounting", "maintaining", "accessing", "resizing", "allocating", "deallocating", "redistributing", or the like, refer to the actions and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
    reading deduplication metadata from a first memory of a deduplication computing system, wherein the deduplication metadata comprises a deduplication metadata hash table, wherein the deduplication metadata hash table comprises a plurality of slots with deduplication metadata entries distributed among the plurality of slots based on unique identifiers from the deduplication metadata entries, and wherein the at least a portion of the unique identifiers are mask values each comprising a lower portion of bits of a unique identifier, and wherein the mask value is an index to the slots of the deduplication metadata table;

maintaining deduplicated data for a file system of the deduplication computing system in a second memory;

maintaining the deduplication metadata that describes the deduplicated data of the file system in the first memory of the deduplication computing system, wherein the first memory is a different type of memory and separated from the second memory in the deduplication computing system;

in response to receipt of a request by the deduplication computing system to perform a first operation with deduplicated data of the file system in the second memory, accessing the deduplication metadata in the first memory;

dynamically resizing the deduplication metadata hash table to a new size based on one or more runtime conditions associated with an amount of utilization of the deduplication metadata hash table at runtime;

allocating or deallocating slots for the deduplication metadata hash table based on the new size; and redistributing deduplication metadata entries to slots of the deduplication metadata hash table based on mask values associated with unique identifiers from the deduplication metadata entries.

2. The method of claim 1, wherein the deduplication metadata hash table comprises one or more deduplication metadata entries describing blocks in the file system, the description including at least a logic block number, a unique identifier, a reference count, and a pointer to said each data block in the file system, and wherein the deduplication metadata comprises a checksum array comprising at least a portion of a unique identifier associated with each data block of the file system.

3. The method of claim 2, wherein each slot of the plurality of slots comprises a header and a plurality of entries, the header located at the beginning of each slot and describing a status of the slot, and the plurality of entries storing zero or more deduplication metadata entries following the header, wherein the zero or more deduplication metadata entries are sorted within a slot based on unique identifier.

4. The method of claim 3, wherein the deduplication metadata further comprises a granular lock array, wherein a first set of one or more locks referenced in the granular lock array block a second operation of the deduplication computing system when the second operation is associated with deduplication metadata located in a same slot as the deduplication metadata associated with the first operation, and wherein a second set of one or more locks referenced in the granular lock array do not block a third operation of the deduplication computing system when the third operation is associated with deduplication metadata located in a different slot from the slot where the deduplication metadata associated with the first operation is located.

5. The method of claim 3, wherein the amount of utilization of the deduplication metadata hash table is based, at least in part, on one or more runtime conditions comprising a number of deduplication metadata entries within one or more slots of the deduplication metadata hash table, a total number of deduplication metadata entries within the deduplication metadata hash table, and a total number of data blocks within the file system.

6. The method of claim 2, wherein the checksum array comprises an array or sequential entries, each entry corresponding to a logical block of the file system, wherein an entry in the array comprises at least a portion of a unique identifier for data, if any, within a logic block of the file system.

7. The method of claim 6, wherein the at least a portion of the unique identifier is a mask value comprising a lower portion of bits of the unique identifier, and wherein the mask value is an index to the slots of the deduplication metadata table.

8. The method of claim 1, wherein the second memory is a volatile memory of the deduplication computing system, and wherein the first memory is a non-volatile memory coupled with the deduplication computing system.

9. The method of claim 8, wherein the volatile memory comprises at least one of a random access memory and a flash memory.

10. The method of claim 8, wherein the non-volatile memory comprises at least one of a hard disk drive, an array of aggregated hard disks, a storage area network, and a network attached storage.

11. The method of claim 1, wherein the deduplication computing system processes data operations in a data path between a virtual machine and the second memory, in real time or substantially real-time.

12. An article of manufacture having one or more non-transitory computer readable storage media storing executable instructions thereon which when executed cause a system to perform a method comprising:

reading deduplication metadata from a first memory of a deduplication computing system, wherein the deduplication metadata comprises a deduplication metadata hash table, wherein the deduplication metadata hash table comprises a plurality of slots with deduplication metadata entries distributed among the plurality of slots based on unique identifiers from the deduplication metadata entries, and wherein the at least a portion of the unique identifiers are mask values each comprising a lower portion of bits of a unique identifier, and wherein the mask value is an index to the slots of the deduplication metadata table;

maintaining deduplicated data for a file system of the deduplication computing system in a second memory;

maintaining the deduplication metadata that describes the deduplicated data of the file system in the first memory of the deduplication computing system, wherein the first memory is a different type of memory and separated from the second memory in the deduplication computing system;

in response to receipt of a request by the deduplication computing system to perform a first operation with deduplicated data of the file system in the second memory, accessing the deduplication metadata in the first memory;

dynamically resizing the deduplication metadata hash table to a new size based on one or more runtime conditions associated with an amount of utilization of the deduplication metadata hash table at runtime;

allocating or deallocating slots for the deduplication metadata hash table based on the new size; and redistributing deduplication metadata entries to slots of the deduplication metadata hash table based on mask values associated with unique identifiers from the deduplication metadata entries.

13. The article of manufacture of claim 12, wherein the deduplication metadata hash table comprises one or more deduplication metadata entries describing blocks in the file system, the description including at least a logic block number, a unique identifier, a reference count, and a pointer to said each data block in the file system, and wherein the deduplication metadata comprises a checksum array comprising at least a portion of a unique identifier associated with each data block of the file system.

14. The article of manufacture of claim 13, wherein each slot of the plurality of slots comprises a header and a plurality of entries, the header located at the beginning of each slot and describing a status of the slot, and the plurality of entries storing zero or more deduplication metadata entries following the header, wherein the zero or more deduplication metadata entries are sorted within a slot based on unique identifier.

15. The article of manufacture of claim 14, wherein the deduplication metadata further comprises a granular lock array, wherein a first set of one or more locks referenced in the granular lock array block a second operation of the deduplication computing system when the second operation is associated with deduplication metadata located in a same slot as the deduplication metadata associated with the first operation, and wherein a second set of one or more locks referenced in the granular lock array do not block a third operation of the deduplication computing system when the third operation is associated with deduplication metadata located in a different slot from the slot where the deduplication metadata associated with the first operation is located.

16. The article of manufacture of claim 14, wherein the amount of utilization of the deduplication metadata hash table is based, at least in part, on
one or more runtime conditions comprising a number of deduplication metadata entries within one or more slots of the deduplication metadata hash table, a total number of deduplication metadata entries within the deduplication metadata hash table, and a total number of data blocks within the file system.

17. The article of manufacture of claim 13, wherein the checksum array comprises an array or sequential entries, each entry corresponding to a logical block of the file system, wherein an entry in the array comprises at least a portion of a unique identifier for data, if any, within a logic block of the file system.

18. The article of manufacture of claim 17, wherein the at least a portion of the unique identifier is a mask value comprising a lower portion of bits of the unique identifier, and wherein the mask value is an index to the slots of the deduplication metadata table.

19. The article of manufacture of claim 12, wherein the second memory is a volatile memory of the deduplication computing system, and wherein the first memory is a non-volatile memory coupled with the deduplication computing system.

20. The article of manufacture of claim 19, wherein the volatile memory comprises at least one of a random access memory and a flash memory.

21. The article of manufacture of claim 19, wherein the non-volatile memory comprises at least one of a hard disk drive, an array of aggregated hard disks, a storage area network, and a network attached storage.

22. The article of manufacture of claim 12, wherein the deduplication computing system processes data operations in a data path between a virtual machine and the second memory, in real time or substantially real-time.

23. A deduplication computing system comprising:
a first memory to store deduplication metadata;
a second memory to store deduplicated data; and
a processor coupled with the first memory and the second memory to
read the deduplication metadata from the first memory, wherein the deduplication metadata comprises a deduplication metadata hash table, wherein the deduplication metadata hash table comprises a plurality of slots with deduplication metadata entries distributed among the plurality of slots based on unique identifiers from the deduplication metadata entries, and wherein the at least a portion of the unique identifiers are mask values each comprising a lower portion of bits of a unique identifier, and wherein the mask value is an index to the slots of the deduplication metadata table,
maintain the deduplicated data for a file system of the deduplication computing system in the second memory,
maintain the deduplication metadata that describes the deduplicated data of the file system in the first memory of the deduplication computing system, wherein the first memory is a different type of memory and separated from the second memory in the deduplication computing system,
in response to receipt of a request by the deduplication computing system to perform a first operation with deduplicated data of the file system in the second memory, access the deduplication metadata in the first memory;
dynamically resize the deduplication metadata hash table to a new size based on one or more runtime conditions associated with an amount of utilization of the deduplication metadata hash table at runtime;
allocating or deallocating slots for the deduplication metadata hash table based on the new size; and
redistributing deduplication metadata entries to slots of the deduplication metadata hash table based on mask values associated with unique identifiers from the deduplication metadata entries.

24. The deduplication computing system claim 23, wherein the deduplication metadata hash table comprises one or more deduplication metadata entries describing blocks in the file system, the description including at least a logic block number, a unique identifier, a reference count, and a pointer to said each data block in the file system, and wherein the deduplication metadata comprises a checksum array comprising at least a portion of a unique identifier associated with each data block of the file system.

25. The deduplication computing system of claim 23, wherein the second memory is a volatile memory of the deduplication computing system, and wherein the first memory is a non-volatile memory coupled with the deduplication computing system.

26. The deduplication computing system of claim 23, wherein the deduplication computing system processes data operations in a data path between a virtual machine and the second memory, in real time or substantially real-time.

* * * * *